United States Patent
Ryon et al.

(10) Patent No.: US 12,158,108 B2
(45) Date of Patent: Dec. 3, 2024

(54) SLANTED LOADING FOR LINE REPLACEABLE MULTIPOINT FUEL INJECTOR ARRAYS

(71) Applicant: Collins Engine Nozzles, Inc., Des Moines, IA (US)

(72) Inventors: Jason A. Ryon, Carlisle, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/109,622

(22) Filed: Feb. 14, 2023

(65) Prior Publication Data
US 2024/0271569 A1    Aug. 15, 2024

(51) Int. Cl.
*F02C 7/22*       (2006.01)
*F02M 53/04*     (2006.01)
*F02M 61/14*     (2006.01)

(52) U.S. Cl.
CPC ........... *F02C 7/222* (2013.01); *F02M 53/046* (2013.01); *F02M 61/14* (2013.01); *F05D 2240/35* (2013.01)

(58) Field of Classification Search
CPC ...... F02C 7/222; F02M 53/046; F02M 61/14; F23R 3/002; F23R 3/283; F23R 3/50; F23R 3/60
See application file for complete search history.

(56) References Cited

U.S. PATENT DOCUMENTS

| | | | |
|---|---|---|---|
| 8,448,449 B2 | 5/2013 | Carlisle | |
| 10,830,442 B2 | 11/2020 | Berry et al. | |
| 11,131,458 B2 | 9/2021 | Prociw et al. | |
| 11,248,528 B2 | 2/2022 | Prociw et al. | |
| 11,408,609 B2 | 8/2022 | Prociw et al. | |
| 2008/0092547 A1 | 4/2008 | Lockyer et al. | |
| 2009/0277185 A1 | 11/2009 | Goeke et al. | |
| 2011/0030377 A1 | 2/2011 | Lockyer et al. | |
| 2013/0132303 A1 | 5/2013 | Gates | |
| 2018/0283692 A1 | 10/2018 | Ryon et al. | |
| 2020/0018238 A1* | 1/2020 | Ryon | F23R 3/10 |
| 2020/0132303 A1* | 4/2020 | Prociw | F23R 3/28 |
| 2022/0065167 A1 | 3/2022 | Ryon et al. | |
| 2022/0099027 A1 | 3/2022 | Griffis et al. | |
| 2022/0195930 A1 | 6/2022 | Ryon et al. | |

OTHER PUBLICATIONS

Partial Search Report from European Application No. 24157315.3, dated Jun. 26, 2024, 12 pages.

* cited by examiner

*Primary Examiner* — Scott J Walthour
(74) *Attorney, Agent, or Firm* — Kinney & Lange, P.A.

(57) ABSTRACT

A system includes an engine case for a gas turbine engine defined around a longitudinal axis. A plurality of access openings are defined through the engine case. A combustor is housed in the space inside the engine case. The inner annular wall of the combustor includes a first rail on an upstream end thereof with a radially outward opening slot. The outer annular wall of the combustor includes a second rail on an upstream end thereof. A plurality of circumferentially spaced apart dome liners extending from the first rail to the second rail. Each dome liner extends tangentially in a direction oblique relative to a radius extending from the longitudinal axis. A plurality of multipoint fuel injector components are assembled across the first and second rails to from a combustor dome together with the dome liners.

13 Claims, 7 Drawing Sheets

SLANTED LOADING FOR LINE REPLACEABLE MULTIPOINT FUEL INJECTOR ARRAYS

BACKGROUND

1. Field

The present disclosure relates to fuel injection and combustion systems, and more particularly to fuel injection and combustion systems for gas turbine engines.

2. Description of Related Art

Fuel injectors can be line replaceable. However, the typical line replaceable fuel injector requires the mechanical load to be carried by the engine case. This results in a large cantilevered mass, and therefore requires substantial strength in the flange and feedarm to be strong enough to prevent fatigue.

In addition, the fuel injector requires burner seals to allow for axial and radial movement caused by a mismatch due to differential thermal expansion between the combustor and the engine case. This can allow air to leak between injector and dome, can reduce the amount of thermal cooling on the dome, and can be a fretting point between the injector and burner seals. Multipoint fuel injector arrays have many advantages. Due to the number of fuel connections, it is difficult to get fuel to every injector tip. Internal fuel manifolds have been shown to work, but these manifolds do not allow line replaceability of the injector array.

The conventional techniques have been considered satisfactory for their intended purpose. However, there is an ever present need for improved systems and methods for line replaceable multipoint fuel injectors. This disclosure provides a solution for this need.

SUMMARY

A system includes an engine case for a gas turbine engine defined around a longitudinal axis. A plurality of access openings are defined through the engine case for access from outside the engine case to a space inside the engine case. A combustor is housed in the space inside the engine case. The combustor includes an inner annular wall and an outer annular wall radially outboard from the inner annular wall. The inner annular wall includes a first rail on an upstream end thereof with a radially outward opening slot. The outer annular wall includes a second rail on an upstream end thereof. The combustor includes a plurality of circumferentially spaced apart dome liners extending from the first rail to the second rail. Each dome liner in the plurality of dome liners extends tangentially in a direction oblique relative to a radius extending from the longitudinal axis, so that the point where the dome liner meets the second rail is circumferentially offset from the point where the dome liner meets the first rail.

A plurality of fuel injector components can be assembled across the first and second rails to from a combustor dome together with the dome liners at an upstream end of a combustion space defined between the inner and outer annular walls of the combustor. Each access opening of the engine case and the fuel injector components can be configured so that the access opening is wide enough in a circumferential direction relative to the longitudinal axis to admit only one of the fuel injector components therethrough. Each access opening of the engine case can be covered by a radially outward flange of a respective one of the fuel injector components. The radially outward flange can include one or more manifold tubes extending circumferentially therethrough.

Each of the fuel injector components can include an inner edge configured to seat in the radially outward opening slot. Each dome liner can have a clockwise facing slot and a counter-clockwise facing slot. Each fuel injector component can include a first side edge seated in a respective one of the clockwise facing slots, and an opposed second side edge seated in a respective one of the counter-clockwise facing slots. Each of the fuel injector components can include an outer edge configured to seat against the second rail. Each fuel injector component in the plurality of fuel injector components can include a combustor dome plate extending from a radially inner edge to a radially outer edge and extending circumferentially from a first side edge to a second side edge, and a plurality of fuel injectors defined through the combustor dome plate, each fuel injector of the plurality of fuel injectors including passages for air and fuel injection into the combustion space.

Each fuel injector component can include a fuel tube tree extending radially inward from a radially outward flange the fuel injector component. The flange can be configured to mount the fuel injector component to the engine case. The fuel tube tree can include a respective branch connecting with each of the plurality of fuel injectors for fluid communication of fuel from the radially outward flange into the plurality of injectors. The fuel tube tree can have a main stem connected in fluid communication with one or more manifold tubes extending circumferentially through the flange. The one or more manifold tubes of each circumferentially adjacent pair of the fuel injector components can be connected in fluid communication with respective fuel transfer tube connectors. The main stem can include one or more fuel tubes in fluid communication with the fuel tube tree and with the one or more manifold tubes. Each of the one or more fuel tubes can include a coiled section for accommodating thermal expansion and contraction differentials between the engine case and the combustor. The external fuel source can be connected in fluid communication the one or more transfer tubes and/or manifold tubes of one or more of the plurality of fuel injector components.

Each fuel injector component in the plurality of fuel injector components can include a heat shield extending around the one or more fuel tubes from the radially outward flange. The radially outer edge of the combustor dome plate of each of the fuel injector components can be captured against the second rail on an axially downstream side by a respective one of the clockwise slots and a respective one of the counter-clockwise slots.

The injectors of the plurality of fuel injector components can from an injector pattern wherein a first sub-set of the injectors form an outer circumferential ring of injectors. The first sub-set of the injectors can be evenly spaced apart circumferentially with a first spacing. A second sub-set of the injectors can form a second circumferential ring of injectors, radially inward from the outer circumferential ring of injectors. The second sub-set of the injectors can be evenly spaced apart circumferentially with a second spacing smaller than the first spacing. The second sub-set of the injectors can be circumferentially offset from the first sub-set of the injectors. A third sub-set of the injectors can form an inner circumferential ring of injectors, radially inward from the second circumferential ring of injectors. The third sub-set of the injectors can be evenly spaced apart circumferentially with a third spacing smaller than the second spacing. The third sub-set of the injectors can be circumferentially offset from the first and second sub-sets of the injectors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
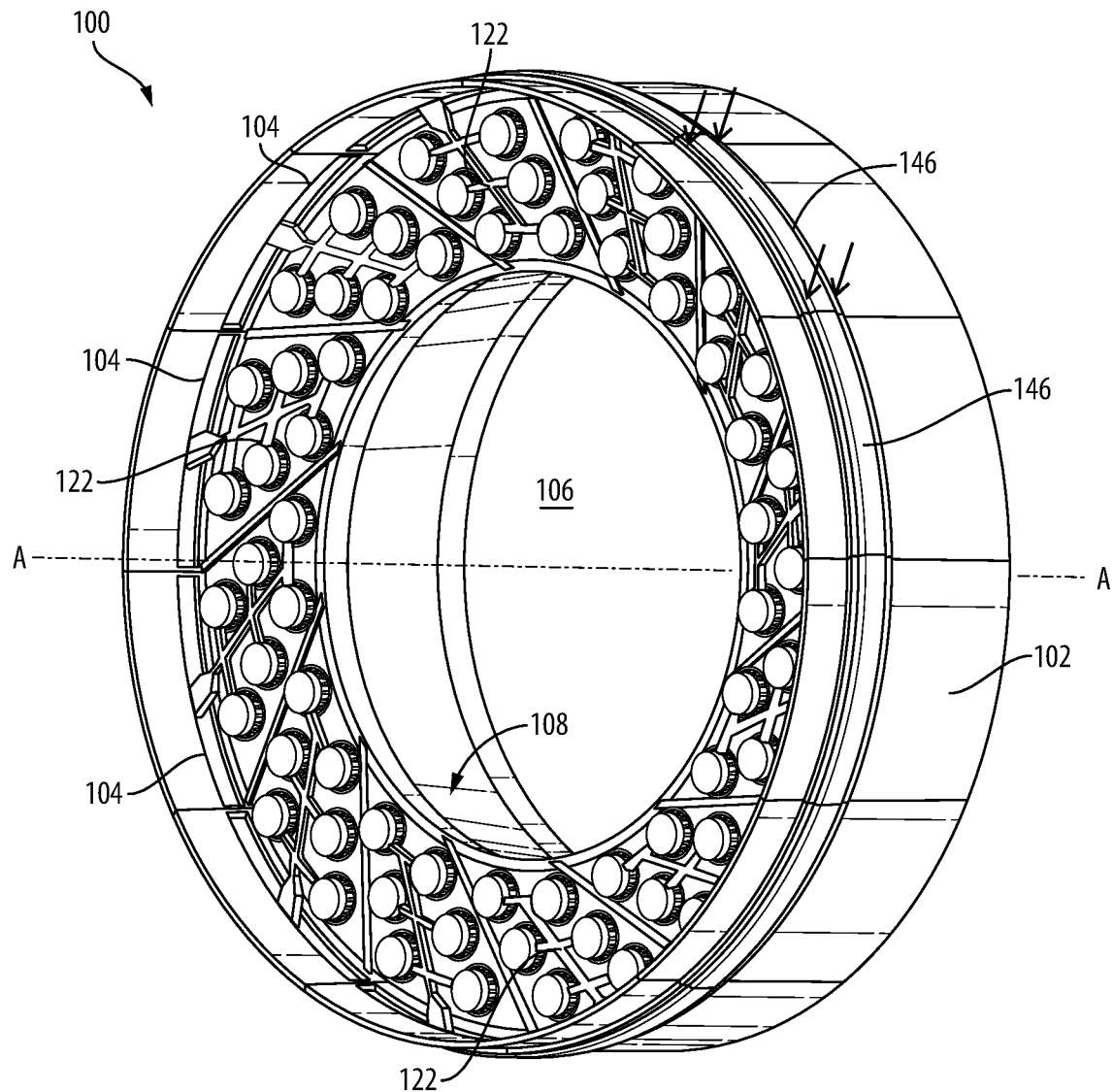
FIG. 1 is a schematic perspective view of an embodiment of a system constructed in accordance with the present disclosure, showing the engine case, combustor dome, and external fuel manifold.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to provide line replaceability for fuel injector components with multipoint injection configurations.

Figure 2:
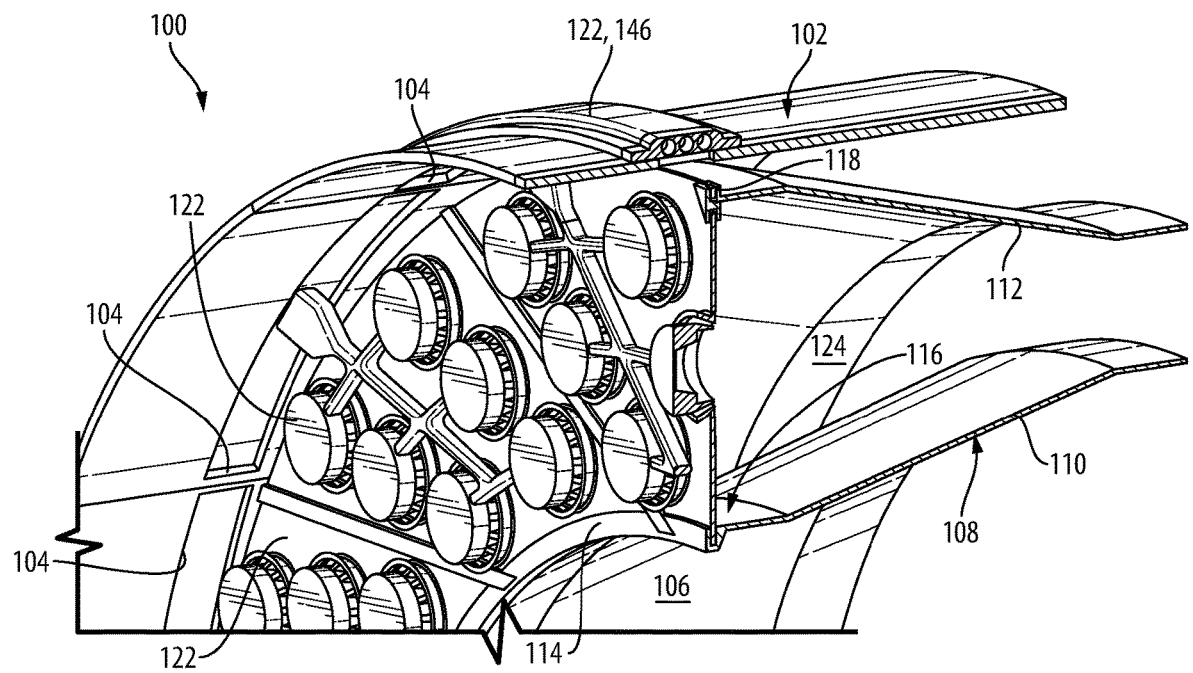
FIG. 2 is a schematic cross-sectional perspective view of the system of FIG. 1, showing fuel staging in the fuel injector components of the combustor dome.

The system 100 includes an engine case 102 for a gas turbine engine defined around a longitudinal axis A. As shown in FIG. 2, a plurality of access openings 104 are defined through the engine case for access from outside the engine case to a space 106 inside the engine case. A combustor 108 is housed in the space 106 inside the engine case 102. The combustor 108 includes an inner annular wall 110 and an outer annular wall 112 radially outboard from the inner annular wall 110. The inner annular wall 110 includes a first rail 114 on an upstream end thereof with a radially outward opening slot 116. The outer annular wall 112 includes a second rail 118 on an upstream end thereof.

Figure 3:
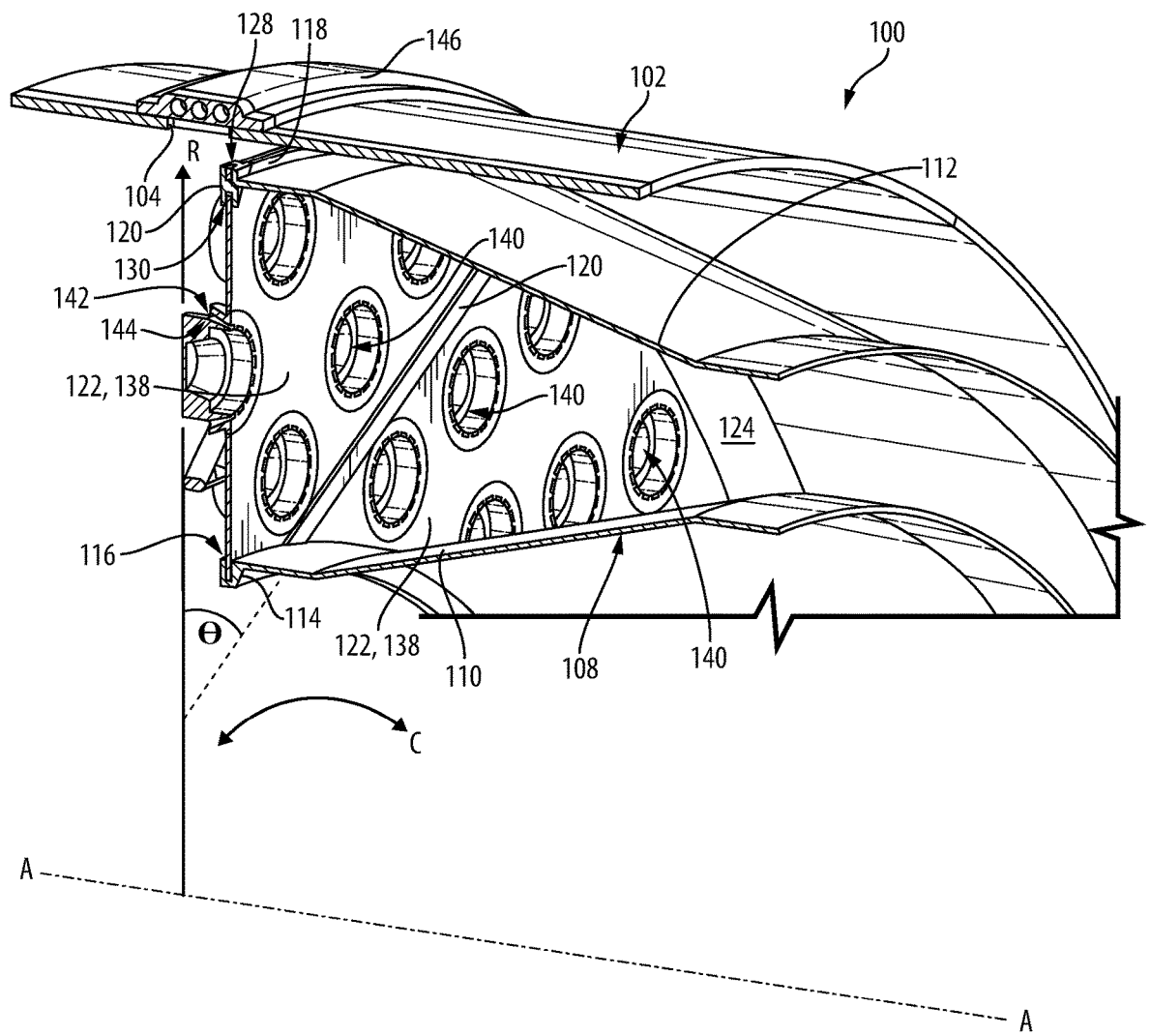
FIG. 3 is a schematic cross-sectional perspective view of the system of FIG. 2, showing the downstream face of the combustor dome.

With reference now to FIG. 3, the combustor 108 includes a plurality of circumferentially spaced apart dome liners 120 extending from the first rail 114 to the second rail 118. Each dome liner 120 extends tangentially in a direction oblique relative to a radius R extending from the longitudinal axis A. The oblique angle θ relative to the angle R is labeled in FIG. 3, and the Radius R and the oblique angle θ lie in a plane defined by the combustor dome, which is further described below. For each of the dome liners 120, the point P1 (labeled in FIG. 6) where the dome liner 120 meets the second rail 118 is circumferentially offset, i.e. clocked clockwise or counter clockwise, from the point P2 (labeled in FIG. 6) where the dome liner 120 meets the first rail 114.

With continued reference to FIG. 3, a plurality of fuel injector components 122 are assembled across the first and second rails 114, 118 to from a combustor dome together with the dome liners 120 at an upstream end of a combustion space 124 defined between the inner and outer annular walls 110, 112 of the combustor 108. As labeled in FIG. 3 on the cross-sectioned dome liner 120, each dome liner 120 has a clockwise facing slot 128 (also labeled in FIG. 6) and a counter-clockwise facing slot 130, where clockwise and counter-clockwise are considered from as oriented in the upstream views such as in FIGS. 1 and 6.

Figure 4:
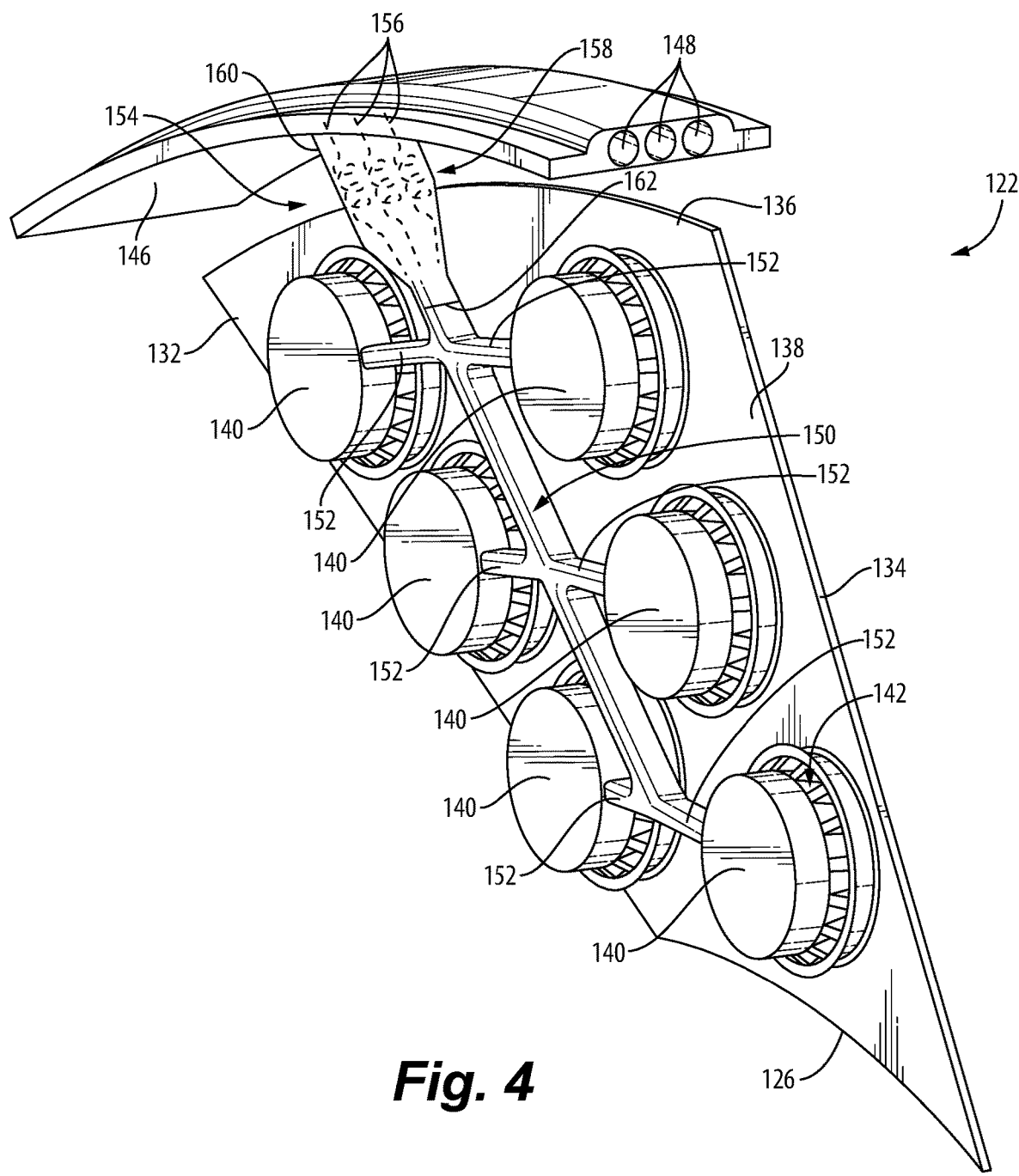
FIG. 4 is a schematic perspective view of a portion of the system of FIG. 1, showing one of the line replaceable multipoint fuel injector components.
Figure 6:
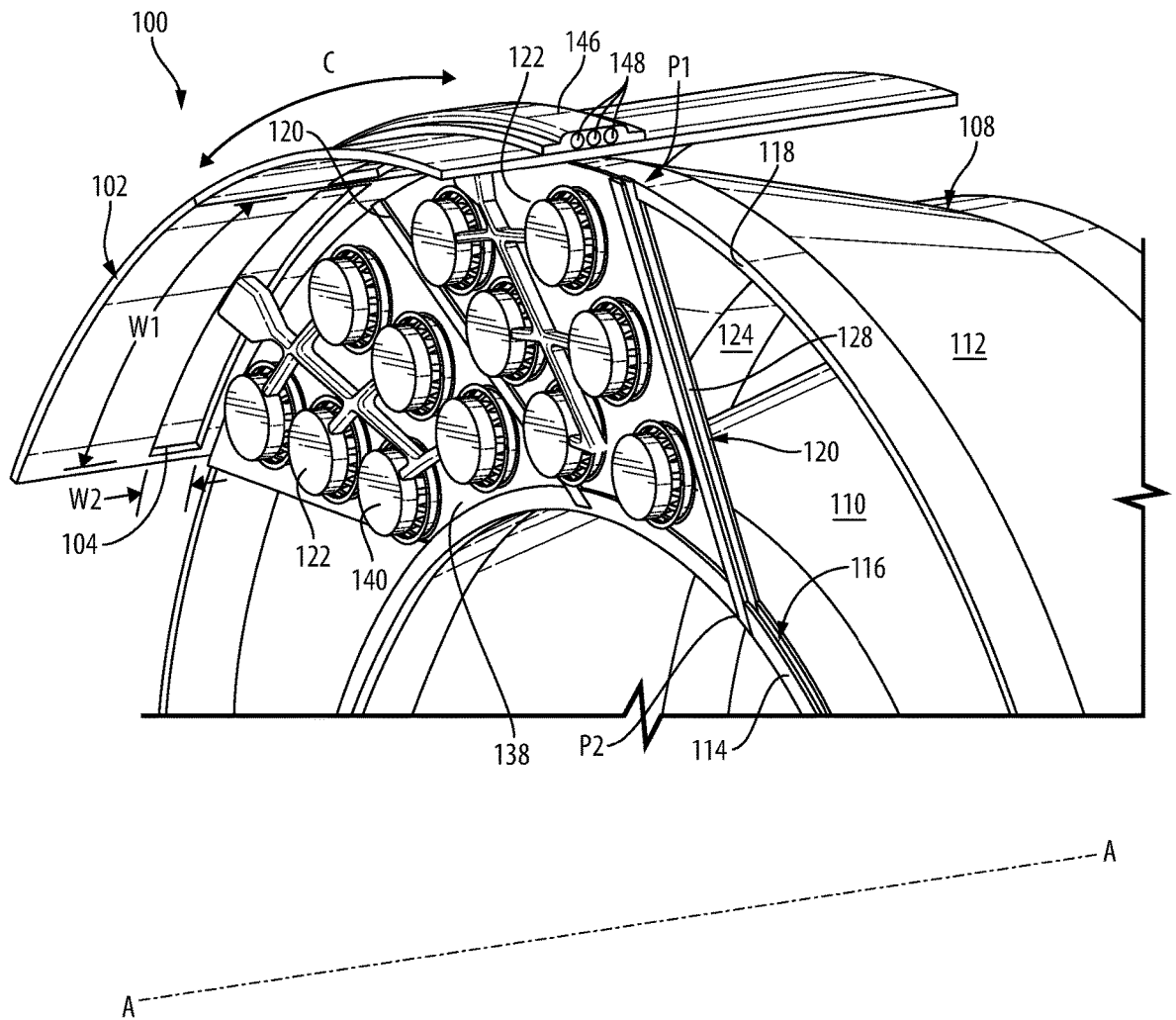
FIG. 6 is a schematic cross-sectional perspective view of a portion of the system of FIG. 1, with some of the multipoint fuel injector components removed to show the slots in the first rail of the combustor and in one of the combustor liners.

Referring now to FIG. 4, each of the fuel injector components 122 is configured to be a line replaceable unit (LRU) and includes an inner edge 126 configured to seat in the radially outward opening slot 116 (labeled in FIG. 6). Each fuel injector component 122 includes a first side edge 132 seated in a respective one of the clockwise facing slots 128 (as shown in FIG. 6), and an opposed second side edge 134 seated in a respective one of the counter-clockwise facing slots 130 (as shown in FIG. 3). Each of the fuel injector components includes an outer edge 136 configured to seat against the second rail 118, as shown in FIG. 3. The radially outer edge 136 is captured against the second rail 118 on an axially downstream side by a respective one of the clockwise slots 128 and a respective one of the counter-clockwise slots 130. The slot 116 in the first rail 114 and the slots 128, 130 in the combustor liners 120 provide air seals and mechanical support for the dome/injector panel or plate 138 against stresses caused by vibration.

With continued reference to FIG. 4, each fuel injector component 122 includes a combustor dome plate 138 extending from the radially inner edge 126 to the radially outer edge 136 and extending circumferentially from the first side edge 132 to the second side edge 134. A plurality of fuel injectors 140 are defined through the combustor dome plate 138. Each fuel injector 140 includes passages 142 for air and passages 144 for fuel, for injection of fuel into the combustion space 124 (the passages 142, 144 are labeled on a cross-sectioned one of the injectors of FIG. 3). The inner edge 126 is shorter than outer edge 136, and is skewed circumferentially, i.e. clocked circumferentially clockwise as oriented in FIG. 4, relative to the outer edge 136. This shape of the dome plate 138 allows for even injector patternation as described further below.

Figure 5:
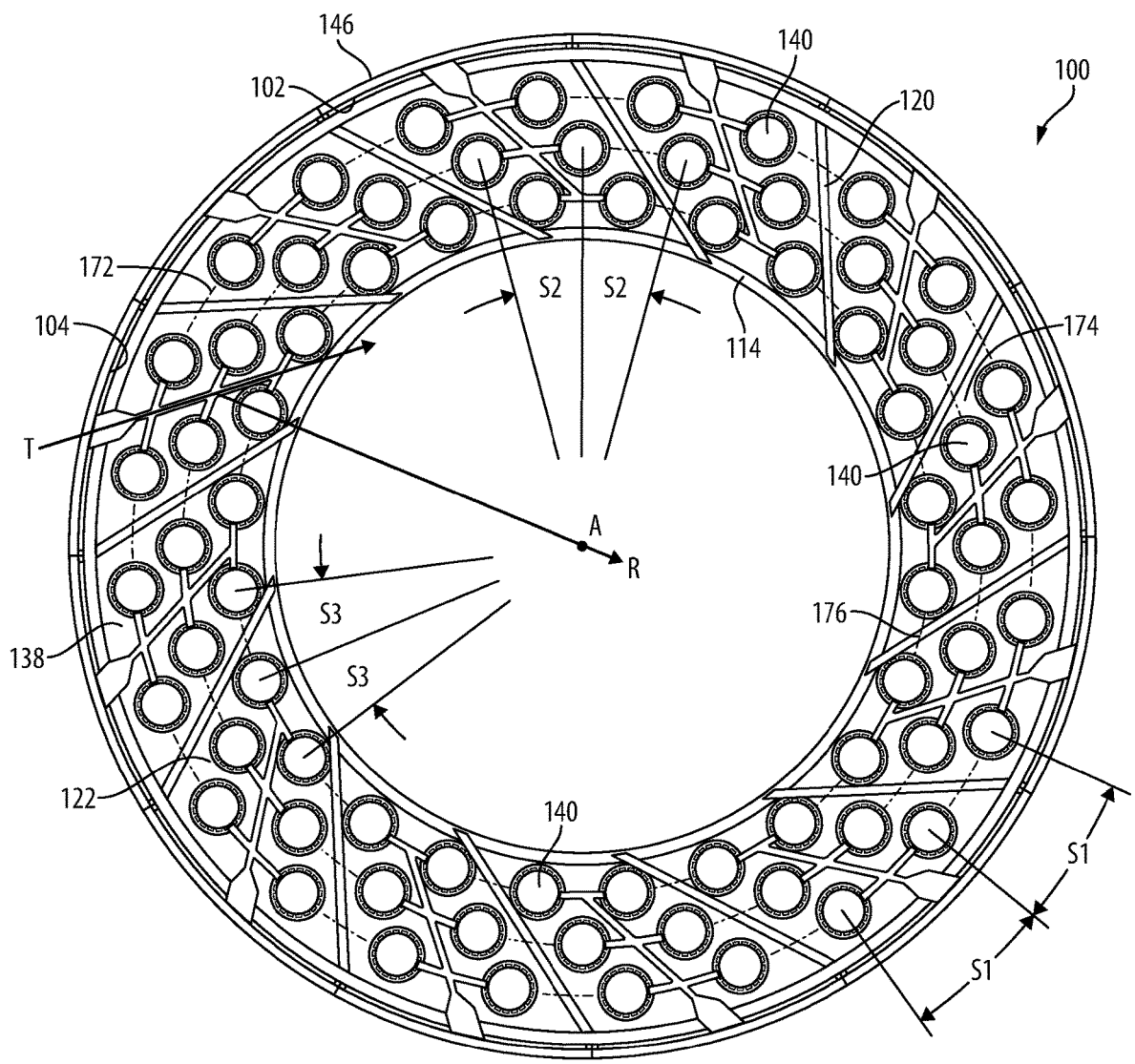
FIG. 5 is a schematic axial upstream elevation view of the system of FIG. 1, showing the insertion direction for one of the multipoint fuel injector components.

With reference now to FIG. 5, due to the circumferentially skewed shape of the dome plates 138, fuel injector components 122 are loaded through the access openings 104 with a diagonal or tangential direction T, not a radial direction R. Similarly, when removed for servicing, replacement, or the like, the fuel injector components can be removed along the tangential direction T but in the opposite direction indicated from that indicated by the tangential direction arrow in FIG. 5.

With reference now to FIG. 6, each access opening 104 of the engine case 102 and the fuel injector components 122 are configured so that the access opening 102 has a width W1 wide enough in the circumferential direction C relative to the longitudinal axis A to admit only one of the fuel injector components 122 therethrough. Each access opening 104 is also has a width W2 wide enough in the axial direction along the longitudinal axis A to admit the dome plate 138 and injectors 140, but narrow enough in the axial direction and in the circumferential direction to be covered over by the flange 146. Each access opening of the engine case is covered by the radially outward flange 146 of a respective one of the fuel injector components 122. The radially outward flange 146 includes one or more manifold tubes 148 extending circumferentially therethrough. Flange bolts can be used to secure the flange 146 to the engine case 102, as indicated in FIG. 1 by the four parallel arrows, and the flange 146 can be sealed to the engine case 102 with any suitable seal.

With reference again to FIG. 4, each fuel injector component 122 includes a fuel tube tree 150 extending radially inward from the radially outward flange 146. The fuel tube tree 150 includes a respective branch 152 connecting with each of the injectors 140 for fluid communication of fuel from the manifold tubes 148 of the radially outward flange 146, into the plurality of injectors 140. The fuel tube tree 150 has a main stem 154 connected in fluid communication with the one or more manifold tubes 148 that extend circumferentially through the flange 146. The main stem 154 includes one or more fuel tubes 156 (three of which are indicated schematically in FIG. 4) in fluid communication with the fuel tube tree 150 and with the one or more manifold tubes 148. Each of the one or more fuel tubes 156 includes a coiled section 158 for accommodating thermal expansion and contraction differentials between the engine case 102 and the combustor 108 (which are labeled in FIG. 1).

With continued reference to FIG. 4, each fuel injector component 122 includes a heat shield 160 extending around the one or more fuel tubes 156, and extending from the radially outward flange 146 inward to a sliding end 162. The end 162 of the heat shield 160 can slide relative to the one or more fuel tubes 156 for thermal compliance under thermal expansion differentials of the engine case 102 and the combustor 108, which are labeled in FIG. 1.

Figure 7:
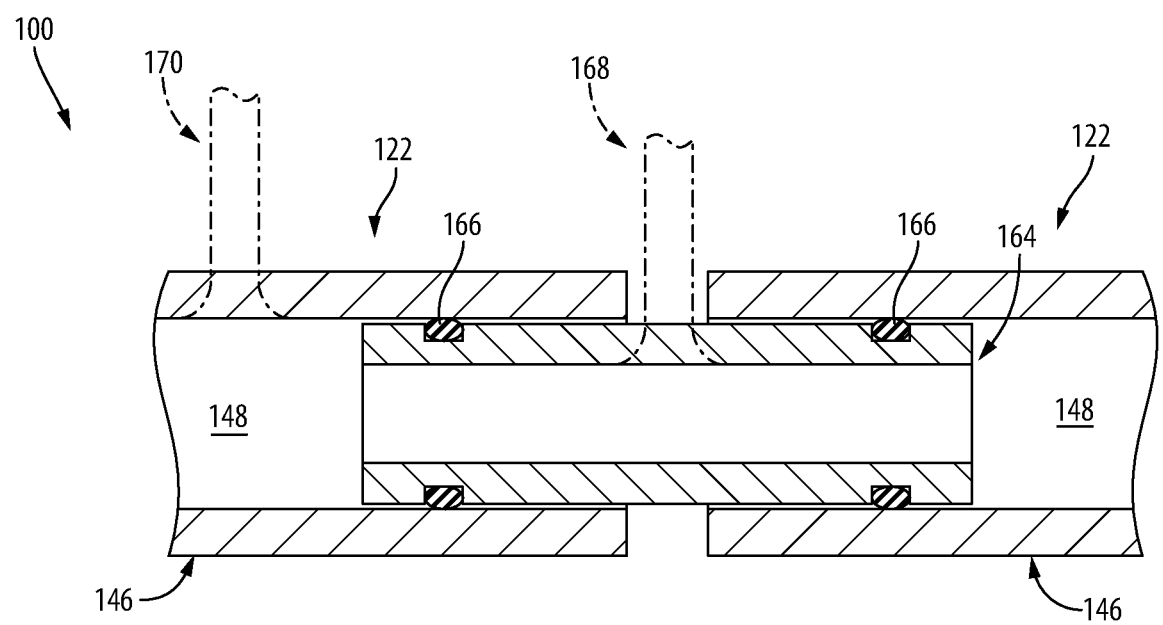
FIG. 7 is a schematic view of a portion of the system of FIG. 1, showing two of the manifold tubes connected with a transfer tube connector.

With reference now to FIG. 7, the one or more manifold tubes 148 in the flanges 146 of each circumferentially adjacent pair of the fuel injector components 122 are connected in fluid communication with respective fuel transfer tube connectors 164. Each transfer tube connector 166 (one of which is shown schematically in FIG. 7) is sealed to both of the adjacent manifold tubes with o-rings 166. The external fuel source for supplying fuel to the manifold tubes 148 is connected in fluid communication the one or more transfer tubes, e.g. modified as a T-connector 168 as indicated by the broken lines in FIG. 7, and/or manifold tubes 148 of one or more of the fuel injector components 122 can include a T-connector 170 as indicated with broken lines in FIG. 7.

With reference again to FIG. 5, the injectors 140 of the plurality of fuel injector components from an injector pattern wherein a first sub-set of the injectors form an outer circumferential ring 172 of injectors 140, indicated in FIG. 5 with the dashed lines. The first sub-set of the injectors are evenly spaced apart circumferentially with a first spacing S1 two injectors 140 of each fuel injector component 122 are in the outer circumferential ring 170.

A second sub-set of the injectors 140 form a second circumferential ring 174 of injectors 140, indicated by the dashed line in FIG. 5. The second circumferential ring 174 is radially inward from the outer circumferential ring 172. The second sub-set of the injectors 140 are evenly spaced apart circumferentially with a second spacing S2 that is smaller than the first spacing S1. The second sub-set of the injectors 140 are circumferentially offset, i.e. clocked in the clockwise direction as oriented in FIG. 5, from the first sub-set of the injectors 140. Two injectors 140 of each fuel injector component 122 are in the second circumferential ring 174.

A third sub-set of the injectors form an inner circumferential ring 176 of injectors 140, radially inward from the second circumferential ring 174. The third sub-set of the injectors 140 are evenly spaced apart circumferentially with a third spacing S3 that is smaller than the second spacing S2. The third sub-set of the injectors 140 are circumferentially offset, i.e. clocked in the clockwise direction as oriented in FIG. 5, from the first and second sub-sets of the injectors 140. Two injectors 140 of each fuel injector component 122 are in the inner circumferential ring 176. The tangential skewing of the dome plates 138, and the tangential loading direction T, allow for the uninterrupted, even circumferential distribution of the injectors 140 for even multipoint fuel injection patternation.

Systems and methods as disclosed herein provide potential benefits including the following. Injectors can be integrated with dome plates, which can allow for eliminating burner seals while providing cooling to dome through thermal conduction from the dome plates to the relatively cool injectors that are integral with the plates. An externally loaded fuel injector panel as shown and described can allow a panel to be line replaceable. An integral external manifold can built into the injector flange. Additionally, the panels can be loaded diagonally to support the tilted pattern of the multipoint lean direct injection (MLDI).

The methods and systems of the present disclosure, as described above and shown in the drawings, provide for line replaceability for fuel injector components with multipoint injection configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
an engine case for a gas turbine engine defined around a longitudinal axis, wherein a plurality of access openings are defined through the engine case for access from outside the engine case to a space inside the engine case;
a combustor housed in the space inside the engine case, wherein the combustor includes an inner annular wall and an outer annular wall radially outboard from the inner annular wall, wherein the inner annular wall includes a first rail on an upstream end of the inner annular wall with a radially outward opening slot, wherein the outer annular wall includes a second rail on an upstream end of the outer annular wall, and wherein the combustor includes a plurality of circumferentially spaced apart dome liners extending from the first rail to the second rail, wherein each dome liner in the plurality of circumferentially spaced apart dome liners extends tangentially in a direction oblique relative to a radius extending from the longitudinal axis so a point where the dome liner meets the second rail is circumferentially offset from a point where the dome liner meets the first rail; and a plurality of fuel injector components assembled across the first and second rails to form a combustor dome together with the plurality of circumferentially spaced apart dome liners at an upstream end of a combustion space defined between the inner and outer annular walls of the combustor, wherein each access opening of the engine case is covered by a radially outward flange of a respective one of the fuel injector components, wherein the radially outward flange includes one or more manifold tubes extending circumferentially therethrough.

2. The system as recited in claim 1, wherein each access opening of the engine case and the fuel injector components are configured so that the access opening is wide enough in a circumferential direction relative to the longitudinal axis to admit only one of the fuel injector components therethrough.

3. The system as recited in claim 1, wherein each of the fuel injector components includes an inner edge configured to seat in the radially outward opening slot, wherein each dome liner has a clockwise facing slot and a counter-clockwise facing slot, and wherein each fuel injector component includes a first side edge seated in a respective one of the clockwise facing slots, and an opposed second side edge seated in a respective one of the counter-clockwise facing slots.

4. The system as recited in claim 1, wherein each of the fuel injector components includes an outer edge configured to seat against the second rail.

5. The system as recited in claim 1, wherein each fuel injector component in the plurality of fuel injector components includes:

a combustor dome plate extending from a radially inner edge to a radially outer edge and extending circumferentially from a first side edge to a second side edge; and a plurality of fuel injectors defined through the combustor dome plate, each fuel injector of the plurality of fuel injectors including passages for air and fuel injection into the combustion space.

6. The system as recited in claim 5, wherein each fuel injector component in the plurality of fuel injector components includes:

a fuel tube tree extending radially inward from h radially outward flange of the fuel injector component, wherein the radially outward flange is configured to mount the fuel injector component to the engine case, wherein the fuel tube tree includes a respective branch connecting with each of the plurality of fuel injectors for fluid communication of fuel from the radially outward flange into the plurality of injectors.

7. The system as recited in claim 6, wherein the fuel tube tree has a main stem connected in fluid communication with the one or more manifold tubes extending circumferentially through the radially outward flange.

8. The system as recited in claim 7, wherein the one or more manifold tubes of each circumferentially adjacent pair of the fuel injector components are connected in fluid communication with respective fuel transfer tube connectors.

9. The system as recited in claim 7, wherein the main stem includes one or more fuel tubes in fluid communication with the fuel tube tree and with the one or more manifold tubes, wherein each of the one or more fuel tubes includes a coiled section for accommodating thermal expansion and contraction differentials between the engine case and the combustor.

10. The system as recited in claim 9, further comprising an external fuel source connected in fluid communication with one or more transfer tubes and/or the one or more manifold tubes of one or more of the plurality of fuel injector components.

11. The system as recited in claim 9, wherein each fuel injector component in the plurality of fuel injector components includes a heat shield extending around the one or more fuel tubes from the radially outward flange.

12. The system as recited in claim 5, wherein the radially outer edge of the combustor dome plate of each of the fuel injector components in the plurality of fuel injector components is captured against the second rail on an axially downstream side by a respective one of the clockwise slots and a respective one of the counter-clockwise slots.

13. The system as recited in claim 5, wherein the plurality of fuel injector components form an injector pattern wherein:

a first sub-set of the plurality of fuel injectors form an outer circumferential ring of fuel injectors, wherein the first sub-set of the plurality of fuel injectors are evenly spaced apart circumferentially with a first spacing;

a second sub-set of the plurality of fuel injectors form a second circumferential ring of fuel injectors, radially inward from the outer circumferential ring of fuel injectors, wherein the second sub-set of the plurality of fuel injectors are evenly spaced apart circumferentially with a second spacing smaller than the first spacing, and wherein the second sub-set of the plurality of fuel injectors are circumferentially offset from the first sub-set of the plurality of fuel injectors; and a third sub-set of the plurality of fuel injectors form an inner circumferential ring of fuel injectors, radially inward from the second circumferential ring of fuel injectors, wherein the third sub-set of the plurality of fuel injectors are evenly spaced apart circumferentially with a third spacing smaller than the second spacing, and wherein the third sub-set of the plurality of fuel injectors are circumferentially offset from the first and second sub-sets of the plurality of fuel injectors.

* * * * *